United States Patent [19]

Achiha et al.

[11] Patent Number: 4,636,857
[45] Date of Patent: Jan. 13, 1987

[54] SCANNING LINE INTERPOLATION CIRCUIT FOR TELEVISION SIGNAL

[75] Inventors: Masahiko Achiha, Iruma; Kazuo Ishikura, Hachioji, both of Japan

[73] Assignee: Hitachi, Ltd., Tokyo, Japan

[21] Appl. No.: 689,804

[22] Filed: Jan. 8, 1985

[30] Foreign Application Priority Data

Feb. 8, 1984 [JP] Japan .................... 59-19920

[51] Int. Cl.⁴ ............... H04N 11/06; H04N 7/04; H04N 7/01
[52] U.S. Cl. .................... 358/140; 358/11; 358/12; 358/141
[58] Field of Search ............... 358/11, 12, 140, 141

[56] References Cited

U.S. PATENT DOCUMENTS

| | | | |
|---|---|---|---|
| 4,322,750 | 3/1982 | Lord et al. | 358/140 |
| 4,426,661 | 1/1984 | Okada et al. | 358/140 |
| 4,492,976 | 1/1985 | van Buul et al. | 358/11 |
| 4,530,004 | 7/1985 | Achiha et al. | 358/11 |
| 4,551,753 | 11/1985 | Nishiyama et al. | 358/140 |

OTHER PUBLICATIONS

T. S. Robson; A Compatible High Fidelity TV Standard for Satellite Broadcast; 16th Annual SMPIF Television Conference Tomorrow's Television; Feb. 1982; pp. 218–236.

Primary Examiner—James J. Groody
Assistant Examiner—John K. Peng
Attorney, Agent, or Firm—Antonelli, Terry & Wands

[57] ABSTRACT

A scanning line interpolation circuit for interpolating scanning lines of an interlaced television signal to thereby obtain a television signal having the doubled number of scanning lines, in which, in order to improve the quality of the reproduced television picture, the interpolation circuit is constituted by a spatio-temporal filter and a time compression circuit, and in the domain of the spatial vertical frequency and the time frequency, the total frequency characteristic of the spatio-temporal filter and the time compression circuit is set such that the response characteristic becomes zero at the vertical frequency and the time frequency of the scanning frequency of the interlaced television signal.

5 Claims, 13 Drawing Figures

SCANNING LINE INTERPOLATION CIRCUIT FOR TELEVISION SIGNAL

The present invention relates to a scanning line interpolation circuit for a television signal, and more particularly to a signal processing circuit for a television signal in which an interlaced television signal is interpolated to thereby obtain a television signal having the doubled number of scanning lines.

There have been developed researches for obtaining high quality television receivers by further improving the reproduced picture quality of current television signals (for example by NTSC system). As an effective one of such researches, there is a proposal of a signal processing circuit in which successive field signals of an interlaced television signal are superimposed, that is, a field memory is employed and input/output signals of the field memory are changed over therebetween every scanning line, so as to obtain a television signal which is a sequential scanning signal and which has the doubled number of scanning lines (for example, as disclosed in UK Patent Application GB No. 2050109A). This signal processing circuit is effective to eliminate such a phenomenon that horizontal lines of characters flit in reproducing an interlaced signal, that is so-called line flicker, to thereby improve in vertical resolution of pictures.

In this signal processing circuit, however, there is a problem that if a picture moves the current field is displayed in a state where it overlaps on a picture one field before so that the displayed picture becomes a double picture to further deteriorate the picture quality, while there is a remarkable effect in improving in picture quality for a stationary picture. To solve this problem there are proposals in which an interpolated scanning lines are obtained by averaging adjacent scanning signals, in which a movement detection circuit is provided in a signal processing circuit and two adjacent interpolated scanning lines are combined, etc. These proposals are disadvantages, however, in that the circuit arrangement becomes complicated, in that no sufficient effect can be obtained in improving in picture quality for both the stationary and moving pictures, etc.

An object of the present invention is to provide a signal processing circuit in which an interlaced television signal is interpolated to thereby obtain a sequential television signal having the multiplied number of scanning lines, the television signal being improved in picture quality such that a double picture is prevented from being generated.

To attain the above-mentioned object, according to the present invention, a scanning line interpolation circuit for obtaining a television signal having the doubled number of scanning lines by interpolating an interlaced television signal is constituted by connecting a time compression circuit in cascade with a spatio-temporal filter in which response becomes zero at the vertical frequency and the time frequency which coincide with the line scanning frequency in the vertical frequency domain and the time frequency domain of the television signal. That is, according to the present invention, it has been found that the deterioration in quality of a picture obtained by a television signal which was obtained by converting an interlaced television signal to double the number of scanning lines is caused due to the harmonic frequency components, espectially spatial and time components causing a visual hindrance, in the case where the interlaced television signal is spatio-temporally sampled, and a means for simultaneously deleting such spatial and temporal components has been completed.

In a preferred embodiment, as will be described later, a first scanning signal is obtained by averaging a signal of a current scanning line of an input interlaced television signal and a signal of a scanning line located directly above the position of the current scanning line, and a second scanning signal is obtained by averaging the above-mentioned signal of the current scanning line and a signal of a scanning line located directly below the position of the current scanning line, the first and second scanning line signals being alternately produced at a scanning line period of an interpolated television signal.

The present invention will be apparent from the following detailed description taken in conjunction with the accompanying drawings, in which.

Figure 7A:
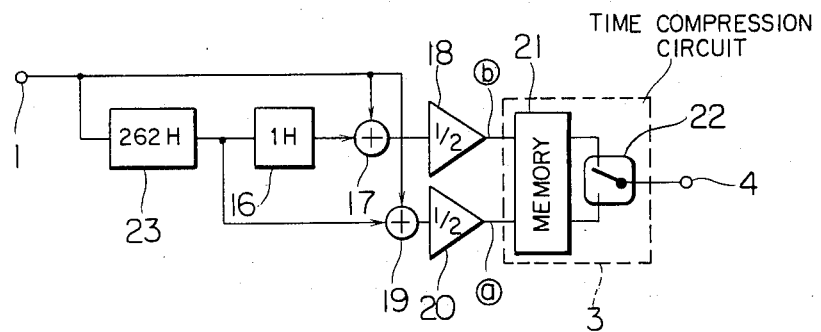
Figure 7B:
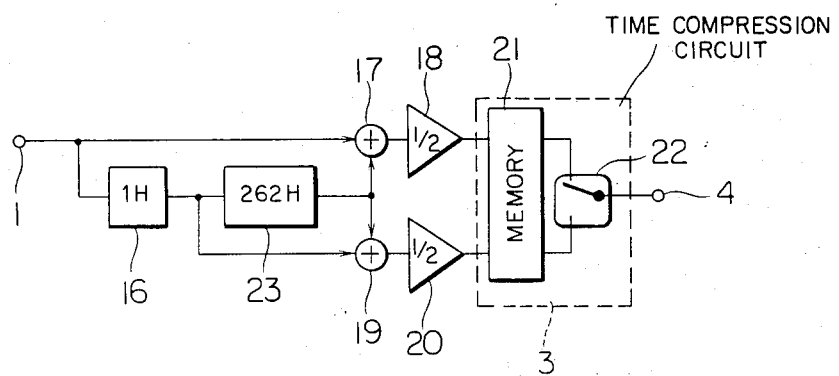
Figure 7C:
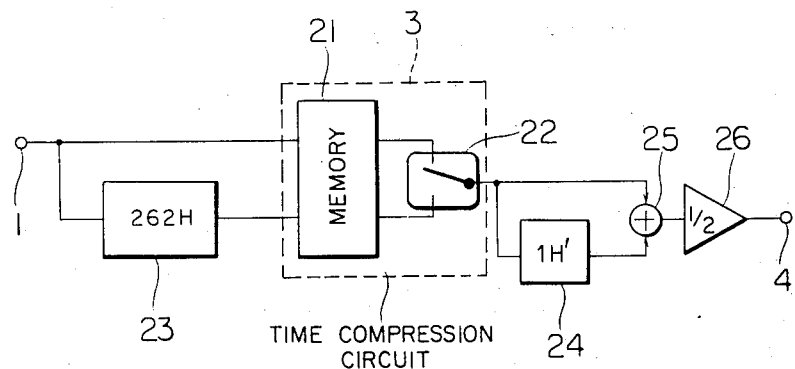
Figure 8A:
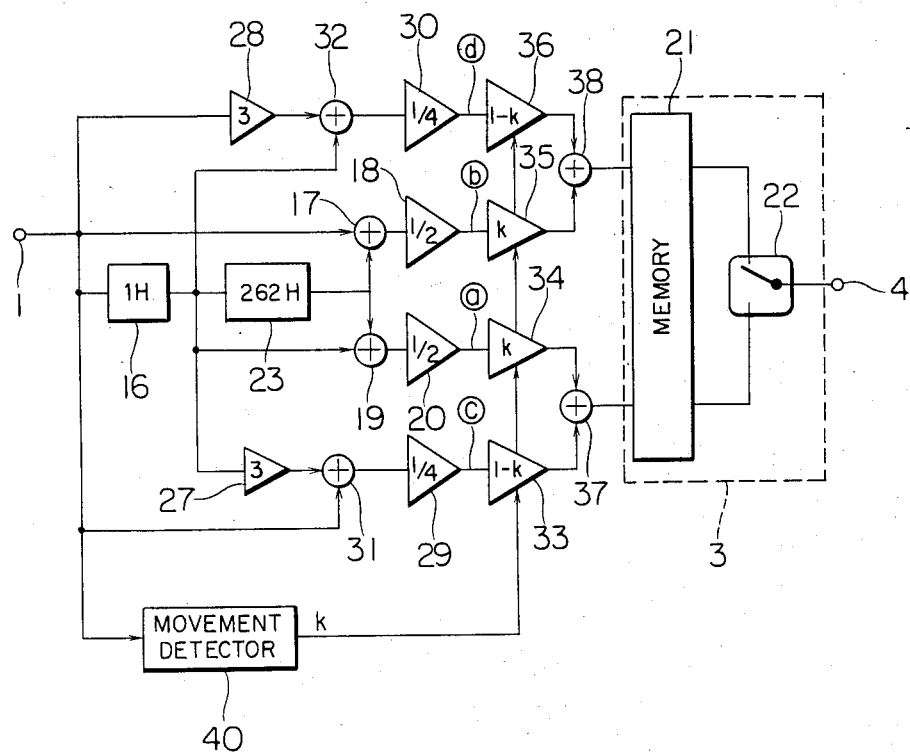
Figure 8B:
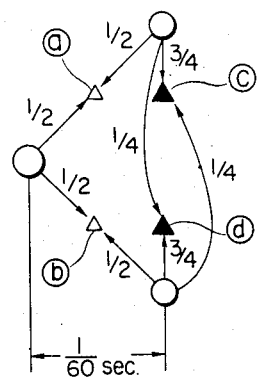

FIGS. 7A, 7B, and 7C are diagrams showing the arrangement of various embodiments of the scanning line interpolation circuit according to the present invention;

FIG. 8A is a diagram showing the arrangement of another embodiment of the scanning line interpolation circuit according to the present invention; and FIG. 8B is a diagram showing a spatio-temporal positional relation of the scanning lines, for explaining the embodiment of FIG. 8A.

Figure 1:
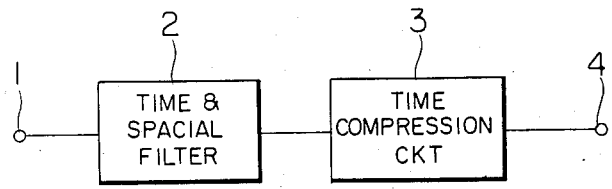
FIG. 1 is a diagram showing the entire arrangement of the scanning line interpolation circuit for a television signal according to the present invention.

Referring now to the drawings, there is shown in FIG. 1 a block diagram of an embodiment of a scanning line interpolation circuit according to our invention.

In FIG. 1, an interlaced television signal is applied through an input terminal 1 to a spatio-temporal filter 2 which is a main part of the embodiment according to the present invention. The output of the filter 2 is converted in a time compression circuit 3 into a sequentially scanned television signal whose scanning line period is a half of that of the input television signal and whose scanning lines are two times in number as large as those of the input television signal, or, in other words, the time compression circuit 3 provides an output of an interpolated television signal with a line rate two times of that of the interlaced television signal, and the thus converted signal is transferred to a display (not shown) through an output terminal 4. The filter 2 may be constituted by filter constituent elements separately provided respectively for the input and output portions of the time compression circuit 3 when the filter 2 is provided at the output side of the time compression circuit 3.

Although the arrangement and operation of the above-mentioned various parts will be described hereunder as to an NTSC system television signal for the sake of explanation and merely by way of example, the television signal to be applied to the input terminal 1 according to the present invention is not limited to such an NTSC system television signal. The television signal applied to the input terminal 1 can be represented by three dimensions (horizontal axis h, vertical axis v, and time axis t) as conceptually shown in FIG. 2.

Figure 2:
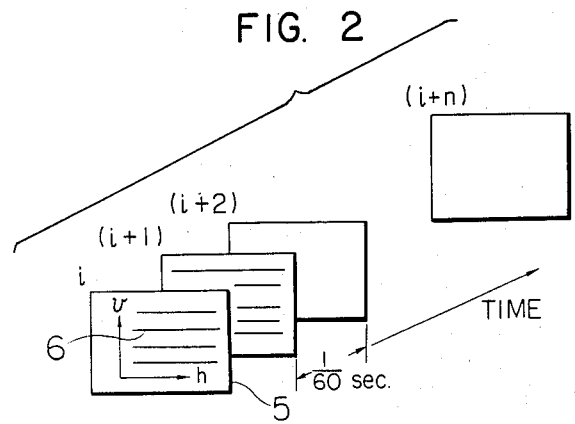
FIG. 2 is a diagram for conceptually explaining an interlaced television signal.
Figure 3:
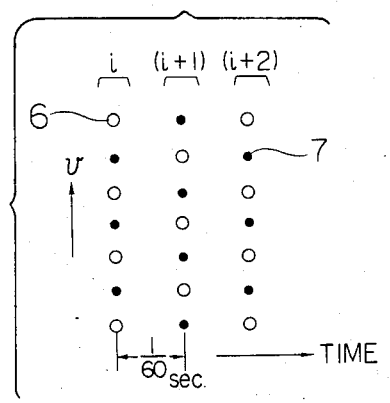
FIG. 3 is a diagram showing the positions of scanning lines of an interlaced television signal.
Figure 4:
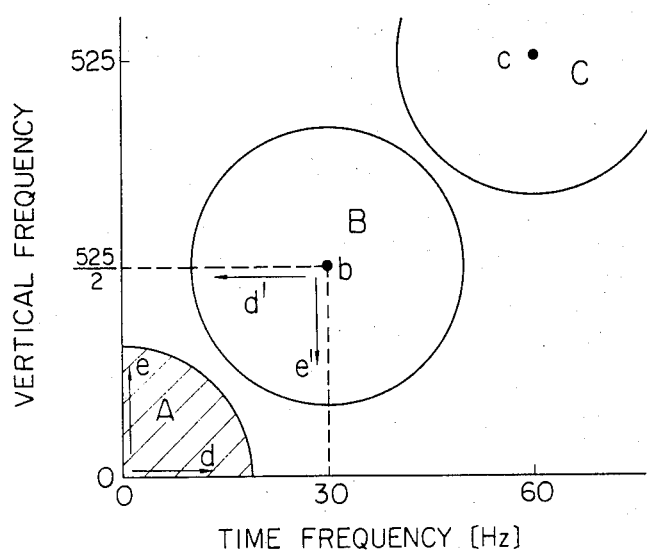
FIG. 4 is a two-dimensional frequency diagram for explaining the spatio-temporal frequency components of a television signal.

In FIG. 2, reference numeral 5 designates a picture represented by one field signal, and 6 a scanning line, and i, i+1, i+2, . . . indicate the order of field. Each scanning line 6 is illustrated by a white dot 6 as shown in FIG. 3, when it is viewed in a two-dimensional plane constituted by the time axis t and the vertical axis v. Each black dot 7 indicates a position where no scanning line exists because the input television signal is an interlaced one. In an interlaced television signal, the scanning lines of one field exist in the middle between corresponding scanning lines on adjacent fields at the opposite sides of the one field. This state can be expressed by spatio-temporal frequencies as shown in FIG. 4. In FIG. 4, the abscissa represents the time frequency $f_t$, that is temporal variations of a picture element, and the ordinate represents the vertical frequency $f_v$, that is vertical variations in the space of the picture element. In the drawing, the hatched portion A represents components of the original picture. For example, stationary picture elements have no temporal variations and therefore they are distributed on the axis of ordinate on which the time frequency is zero, while vertical stripes are distributed on the axis of abscissa on which the vertical frequency is zero.

Since an interlaced television signal is obtained, in view of spatio-temporal space, by sampling a television signal with the time frequency $f_t$ (=30 Hz) or the frame frequency, and the vertical frequency $f_v$ (=525/2 cycle/picture-height) (these frequencies $f_t$ and $f_v$ are referred to as a scanning frequency) (as shown at b in FIG. 4), harmonic components due to sampling are generated in the vicinity (domain B) of the sampling frequency b. For example, the components d and e in the domain A become the frequency components d' and e' in the domain B. The domain C shows the case where sampling is made with a sampling frequency, that is the time frequency $f_t$=60 Hz and the vertical frequency $f_v$=525 cycle/picture-height (for example, harmonic components in the interpolated television signal). As described above, the human sense of visual has a low frequency characteristic with respect to the spatio-temporal frequency and a person perceives low frequency components in the frequency domain as shown in FIG. 4 (the portion encircled by a dotted line). Accordingly, the components in the domain B are perceived as a kind of noise, while the components in the domain A can be perceived correctly. For example, the component e' generates flicker with about 30 Hz at a horizontal stripe portion of a character or the like and the component d' is perceived as a coarse line-structure in the case where a picture without high frequency components moves. Accordingly, artifacts or impairments are felt in a reproduced picture in the current television. The scanning line interpolation circuit serves to insert interpolation scanning lines at the positions of the black dots in FIG. 3 to double the number of the scanning lines including the original ones. This can be explained with respect to the time frequency and the vertical frequency of FIG. 4 such that the doubled sampling frequency is positioned at a position (C in FIG. 4) where both the time frequency and the vertical frequency are doubled with respect to the sampling frequency B corresponding to the scanning line 6. The Nyquist band is the domain encircled by the abscissa, the ordinate, and the dotted lines in FIG. 4. If the scanning line interpolation circuit has such a characteristic that the alias components folded with respect to the two-dimensional frequency b can be sufficiently deleted, no picture quality deterioration due to interlace scanning is generated in the interpolated television signal so that a high quality picture can be obtained.

Figure 5:
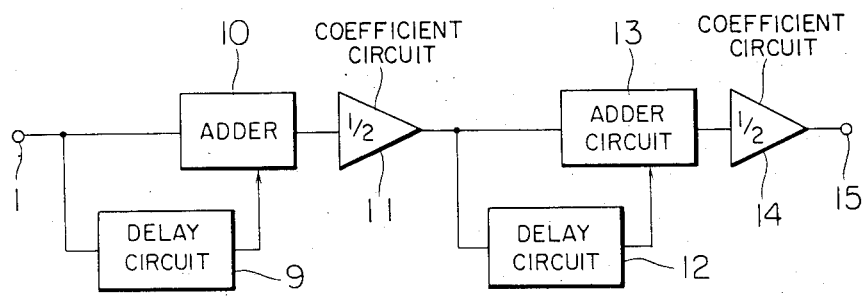
FIG. 5 is a diagram showing an equivalent circuit of a filter for explaining the principle of a spatio-temporal filter used according to the present invention.

The spatio-temporal filter (designated by the reference numeral 2 in FIG. 1) according to the present invention serves, as to the frequency domains in FIG. 4, to allow the components of the domain A to pass while to prevent, with respect to the domain B, at least the components having frequencies lower than the time frequency $f_t$=30 Hz and the vertical frequency $f_v$ (=525/2 cycle/picture-height) from passing. In view of the principle, the spatio-temporal filter may be illustrated as an equivalent circuit as shown in FIG. 5.

Upon reception of a picture of doubled scanning lines including the scanning lines 6 and the interpolation scanning lines 7, a mean value of adjacent scanning lines separated from each other in the time direction by a field period 1/60 sec. is first calculated through a delay circuit 9 (delay time 1/60 sec.), an adder 10, and a coefficient circuit 11. As known well, the transfer characteristic of these circuit can be expressed by the following equation (1) on the basis of the principle of delay filter:

$$H(f_t) = \cos\left(\frac{\pi}{60} f_t\right) \quad (1)$$

Thus, the response at the time frequency 30 Hz becomes zero. Then, this signal is passed through a delay circuit 12 (delay time is one horizontal scanning period of the interpolated doubled scanning lines), an adder 13, and a coefficient circuit 14, to thereby calculate and produce a mean value of vertically adjacent scanning lines. That is, a mean value between signals separated by a half of a distance between two adjacent scanning lines in the same field. The frequency response of the circuit for calculating the mean value in the vertical direction is expressed by the following equation (2) and the output response at the vertical frequency 525/2 (cycle/picture-height) becomes zero.

$$H(f_v) = \cos\left(\frac{\pi}{525} f_v\right) \quad (2)$$

The frequency response of the circuit from the input terminal 1 to an output terminal 15 is the product between the equations (1) and (2) and therefore expressed by the following equation (3):

$$H(f_t, f_v) = \cos\left(\frac{\pi}{60} f_t\right) \times \cos\left(\frac{\pi}{525} f_v\right) \quad (3)$$

Thus, the output becomes zero at both the cases $f_t$=30 Hz and $f_v$=525/2 (cycle/picture-height) so that the pass band in which the output response becomes larger than ½ substantially coincides with the hatched portion A in FIG. 4. Each of the coefficient circuits 11 and 14 is for adjusting the signal level and does not give any essential effect onto the frequency characteristic.

Figure 6A:
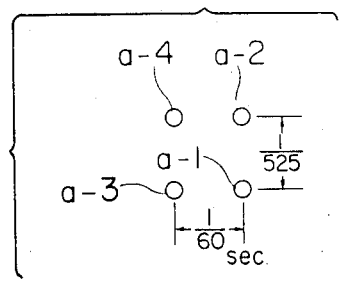
FIGS. 6A, 6B and 6C are diagrams for explaining the operation of the filter of FIG. 5.

FIG. 6 shows the relation between the output of the filter illustrated in FIG. 5 and having the characteristic expressed by the equation (3) and the scanning lines of a television signal. FIG. 6A illustrates four scanning lines a-1, a-2, a-3 and a-4 which are spatio-temporally adjacent to each other under the condition that the field period (that is frame period) is 1/60 sec. and the scanning line interval is 1/525 (picture-height/cycle). That is, the horizontal and vertical directions of FIG. 6A have the same physical meanings as those in FIG. 3. That is to say, the filter of FIG. 5 produces mean values of the respective signals of the scanning lines a-1, a-2, a-3, and a-4 as shown in FIG. 6A. More particularly, a-1 is the signal directly produced at the output terminal 15 without passing through the delay circuits 9 and 12, a-2 the signal passed only the delay circuit 12, a-3 the signal passed only the delay circuit 9, and a-4 the signal passed both the delay circuits 9 and 12. The mean values of these signals a-1, a-2, a-3, and a-4 are produced at the output terminal 15.

Figure 6B:
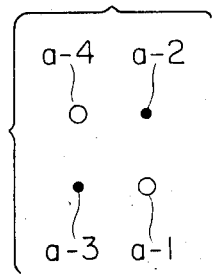
Figure 6C:
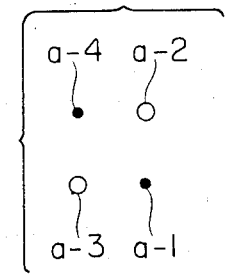

In the case where the input signal is such an interlaced television signal as shown in FIG. 3, however, no input signal exists at the position of the interpolation scanning line 7 and therefore the scanning lines are simplified as illustrated in FIGS. 6B and 6C. That is, there are two cases, one being the case as shown in FIG. 6B where a mean value is produced between the scanning line of in the current field of the current input television signal and a scanning line in the preceding field (that is one field before) of the current input television signal located directly above the first-mentioned scanning line of the current field, and the other being the case as shown in FIG. 6C where a mean value is produced between a scanning line in the current field of the current input television signal and a scanning line in the preceding field (that is one field before) of the current input television signal located directly below the position of the position of the first-mentioned scanning line of the current field. Each of the cases of FIGS. 6A and 6C effects the filtering operation of FIG. 5 and it is apparent that the characteristic of the above-mentioned spatio-temporal filter can be realized.

FIGS. 7A, 7B, and 7C illustrate various embodiments of the interpolation circuit according to the present invention arranged on the basis of the principle as described above.

In FIG. 7A, an input interlaced television signal is applied through an input terminal 1 to adders 17 and 19, and a field memory 23 which delays a received signal by 262H (H represents one horizontal period). Signals delayed by 262H and 263H are obtained through the field memory 23 and a line memory 16 which delays by 1H, respectively. The thus delayed signals are respectively added to the current input television signal in adders 17 and 19, and the respective sums are multiplied by ½ in coefficient circuits 18 and 20 to thereby obtain two kinds of signals and ⓐ and ⓑ for interpolation scanning lines corresponding to the respective cases of FIGS. 6B and 6C. The time axis of these signals ⓐ and ⓑ is compressed to half in a time compression circuit, and the respective outputs of the time compression are alternately changed over by means of a change-over circuit 22 to produce two scanning lins every H period, that is one scanning line signal every ½ H period. In other words, the two scanning line signals are alternately produced at a horizontal scanning period of the interpolated television signal so that a television signal which causes no quality deterioration due to interlace operation (that is the components in the domain B in FIG. 4 are eliminated) but which can display a high quality picture as can be obtained from the output terminal 4. Although a particular arrangement of the time compression circuit 21 is not illustrated, a known circuit may be employed therefor. That is, the circuit may be arranged such that the output of the coefficient circuit 18 or 20 is written into a line memory constituted by a shift register, etc. at a predetermined writing speed and read out at a speed two times as high as the writing speed.

In FIG. 7A, although the delay periods in the delay circuits 23 and 16 are about 1/60 sec. and one horizontal period of the interlaced television signal, respectively, the signal is converted to have a doubled speed so that the frequency characteristic across the input terminal 1 and the output terminal 4 becomes the same as that shown in FIG. 5.

FIG. 7B shows the arrangement of another embodiment in which the input signal is delayed by 1H and 262H to thereby obtain similar interpolation signals. That is, an adder 17 adds a signal of a scanning line of a current input interlaced television signal and a signal of a scanning line one field before and located directly above the position of the first-mentioned scanning line of the current input television signal. An adder 19 adds a 1H delayed signal of a scanning line of the current input television signal (the output of the delay circuit 16) and a signal of a scanning line one line before and located directly above the position of the first-mentioned scanning line of the current input television signal.

FIG. 7C illustrates the arrangement of a further embodiment in which the constituent components of the spatio-temporal filter are divided into two sections disposed at the input and output sides of the time compression circuit respectively. The same parts as those in FIGS. 7A and 7B are designated by the same reference numerals as those used in FIGS. 7A and 7B. In this embodiment, the circuit from an input terminal 1 to the output of a change-over circuit 22 is the same as the conventionally known circuit in which a sequential scanning television signal having the doubled number of scanning lines is obtained by using a scanning line one field before of an interlaced television signal as an interpolation signal. In this embodiment, the above-mentioned known interpolated television signal is added in an adder 25 to a signal obtained by delaying the interpolated television signal in a delay circuit 24 by 1H' (where H' represents one horizontal scanning period of the interpolated television signal and is equal to ½ H) and multiplied by a coefficient ½ in a coefficient circuit 26.

In each of the embodiments of FIGS. 7A, 7B, and 7C, averaged signals between the current input television signal and each of signals obtained by delaying the current input television signal by 262H and 263H are alternately produced through the output terminal 4 at a period of ½ H.

FIG. 8A shows the arrangement of another embodiment of the interpolation circuit according to the present invention.

In each of the embodiments of FIGS. 7A, 7B, and 7C, although a high quality picture can be obtained by preventing deterioration in picture quality due to interlace scanning from occurring, the picture may become somewhat defocused in the case of a moving picture because average values between pictures in adjacent fields are produced. The embodiment of FIG. 8A has an effect to prevent a moving picture from becoming blur.

In FIG. 8A, the reference numerals 1, 3, 4, 16-20, 21-23 designate the same parts or circuit components as those in FIG. 7B. As interpolation signals in a moving picture portion, interpolation signals ⓒ and ⓓ which are located in the vertical positions with respect to the signals ⓐ and ⓑ, as shown in FIG. 8B, are obtained from a signal of a scanning line of the current input television signal and a signal obtained by delaying the first-mentioned scanning line signal by 1H through linear inerpolation through coefficient circuits 27, 28, 29 and 30, adders 31 and 32. The respective outputs of the coefficient circuits 18 and 20 and the respective outputs of the coefficient circuits 30 and 29 are multiplied by coefficients k (0≦k≦1) and (1−k) which change depending on the output k of a movement detection circuit 40 for detecting the degree of picture movement and added in adders 38 and 37 respectively, so that in the case of a stationary picture portion, the value of k is caused to approach 1 (one) to obtain interpolation signals by mean values between upper and lower scanning lines in adjacent fields, while in a moving picture portion, the interpolation signals are changed over to those obtained by scanning lines of the current field by causing the value of k to approach 0 (zero), so that an interpolated television signal, which does not cause any blur in a moving picture is obtained at the output terminal 4.

Although the description has been made above with respect to a black-and-white television signal, it is apparent that a high quality color picture can be displayed also in the case of a color television signal by performing the same processing as described above as to component signals such as a luminance signal and two color difference signals, or tri-color signals, etc. In the case of NTSC system, it is apparent that the interpolation signal ⓑ for a luminance signal can be directly obtained even by processing a composite signal because a polarity of a modulated color signal of a scanning line deviated by 263 H from a current scanning line is opposite to that of the current scanning line, and accordingly, the present invention can be applied to a composite signal.

Further, although the description has been made as to the system in which the number of scanning lines is 525 in view of the current television techniques in Japan and United States, it is apparent that the present invention can be applied to the case of the European system in which the number of scanning lines is 625 by merely changing the capacity of the field memory to 312H.

Although calculation to produce a mean value between adjacent fields has been described in the above embodiments, the present invention is not limited to this, but it is possible to use a high order interpolation filter in which the output becomes zero at $f_t=30H$ (25H in the 625 system) and $f_v=525/2$ (cycle/picture-height) (625/2 cycle/picture-height in the 625 system). Further, an enhancer for enhancing higher frequency components may be connected in cascade with the interpolation circuit and composite impulse response may be calculated.

We claim:

1. A scanning line interpolation circuit for a television signal comprising:
   input means for receiving an interlaced television signal;
   output means for producing an interpolated television signal with a line rate two times of that of the interlaced television signal; and
   a spatio-temporal filter and a time compression circuit connected in cascade between said input means and said output means, the total frequency characteristic of said spatio-temporal filter and said time compression circuit being such a characteristic that the response characteristic becomes zero at a vertical frequency and a time frequency which coincide with an interlace scanning frequency in a vertical and time frequency domain, said spatio-temporal filter including a first circuit for adding a signal of a scanning line in a current field of a current input television signal from said input means and a signal of a scanning line one field before of the current television signal and located directly above the position of the first-mentioned scanning line in said current field, and a second circuit for adding the signal of the scanning line in said current field and a signal of a scanning line one field before of the current television signal and located directly below the position of the first-mentioned scanning line in said current field, and in which said time compression circuit is arranged for storing the respective outputs of said first and second circuit, for reading out alternatively the stored output signals of said first and second circuits every scanning line at a speed two times as high as a horizontal scanning period of said interlaced television signal, and for applying the alternately read-out signals to said output means.

2. A scanning line interpolation circuit for a television signal comprising:
   input means for receiving an interlaced television signal;
   output means for producing an interpolated television signal with a line rate two times of that of the interlaced television signal; and
   a spatio-temporal filter and a time compression circuit connected in cascade between said input means and said output means, the total frequency characteristic of said spatio-temporal filter and said time compression circuit being such a characteristic that the response characteristic becomes zero at a vertical frequency and a time frequency which coincide with an interlace scanning frequency in a vertical and time frequency domain, said spatio-temporal filter including a first circuit for adding a first signal of a scanning line in a current field of a current input television signal from said input means and a second signal of a scanning line one field before of the current television signal and located directly above the position of the first-mentioned scanning line in said current field, and a second circuit for adding said second signal and a third signal obtained by delaying said first current input television signal by one horizontal scanning period, and in which said time compression circuit is arranged for storing the respective outputs of said first and second circuits, for reading out alternately the stored output signals of said first and second circuits every scanning line at a speed two times as high as a horizontal scanning period of said interlaced television signal, and for applying the alternately read-out signals to said output means.

3. A scanning line interpolation circuit for a television signal comprising:

input means for receiving an interlaced television signal;

output means for producing an interpolated television signal with a line rate two times of that of the interlaced television signal; and a spatio-temporal filter and a time compression circuit connected in cascade between said input means and said output means, the total frequency characteristic of said spatio-temporal filter and said time compression circuit being such a characteristic that the response characteristic becomes zero at a vertical frequency and a time frequency which coincide with an interlace scanning frequency in a vertical and time frequency domain, said spatio-temporal filter including a first and a second portion disposed to sandwich said time compression circuit therebetween, said first portion including delay circuit for delaying the current input television signal by one field period, said time compression circuit being arranged for storing the current input television signal from said input means and the output of said delay circuit and for reading out alternately the stored current television signal and the output signal of said delay circuit every scanning line at a speed two times as high as a horizontal scanning period of said interlaced television signal, said second portion being arranged for adding the output of said time compression circuit and a signal obtained by delaying the output of said time compression circuit by the time half a horizontal scanning period of the current input television signal and for applying the sum signal to said output means.

4. A scanning line interpolation circuit for a television signal comprising:

signal means for receiving an interlaced television signal and for producing an interpolated television signal with a line rate two times of that of said interlaced television signal; and a spatio-temporal filter connected with an output of said signal means and having first circuit means and second circuit means connected in series, said first circuit means including a first delay circuit delaying an input signal by one half of a field period of said interlaced television signal and a first adder adding an input signal and the output of said first delay circuit, and said second circuit means includes a second delay circuit delaying an input signal by one half of a line scanning period of said interlaced television signal and a second adder adding an input signal and the output of said second delay circuit.

5. A scanning line interpolation circuit for a television signal according to claim 4, wherein said first delay circuit delays the output of said signal means and said first adder adds the output of said signal means and the output of said first delay circuit, said second delay circuit delaying the output of said first adder and said second adder adding the output of said first adder and the output of said second delay circuit.

* * * * *